Oct. 9, 1928.                                                       1,687,077
                            E. K. BAKER
                PLANETARY REDUCTION GEAR CONSTRUCTION
                          Filed Jan. 8, 1923

Witness:

Inventor:
Erle K. Baker
by: Arthur M. Wilson
        Atty.

Patented Oct. 9, 1928.

1,687,077

UNITED STATES PATENT OFFICE.

ERLE K. BAKER, OF DETROIT, MICHIGAN, ASSIGNOR TO BAKER REDUCTION GEAR COMPANY, OF DETROIT, MICHIGAN, A CORPORATION OF MICHIGAN.

PLANETARY-REDUCTION-GEAR CONSTRUCTION.

Application filed January 8, 1923. Serial No. 611,266.

My invention relates generally to improvements in planetary reduction gears for use in automobile steering equipment and particularly to the type disclosed in my copending application Serial Number 611,265, filed January 8, 1923, and entitled Planetary reduction gears.

In my said co-pending application, I have disclosed a novel construction which is better adapted to automobile requirements than those hitherto devised.

The various advantages thereof will not be here detailed since reference to said copending application will supply full and complete information. However, it may be stated that the invention of said co-pending application accomplishes a greater gear reduction with a construction of given size and also improves the operation of planetary gears by providing what may be termed a constant contact between pairs of intermeshing gears. That is to say the gears of the planetary system are so disposed that one pair of gears will always be in the best driving relation. For example where three intermediate or external spur gears are used one tooth of the central external spur gear will just be entering a tooth opening in one of the intermediate gears, one tooth will just be leaving the tooth opening of another intermediate gear, and at the same time a third tooth will occupy a central position in the tooth opening of the third intermediate gear. This progressive action provides the constant contact before referred to. The structure of my said co-pending application is especially designed for initial equipment and the general object of my present invention is to provide a structure that can be used readily to convert existing planetary steering gear equipment so that it will function as does the structure of my said co-pending application.

My invention consists generally in a device of the form, arrangement, construction, and co-action of the parts, whereby the above named objects, together with others that will appear hereinafter are attainable; and my invention will be more readily understood by reference to the accompanying drawings which illustrate what I consider, at the present time, to be the preferred embodiment thereof.

Figure 1:
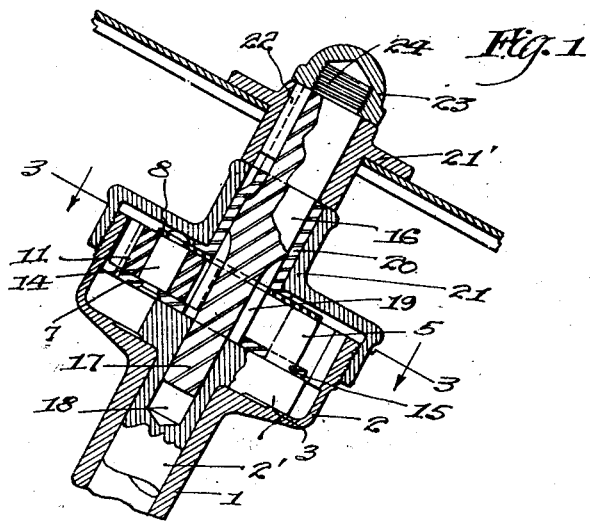
Fig. 1 is a sectional view through a planetary reduction gear embodying my invention as the same is applied to a steering post of automobiles now in general use.
Figures 2, 3:
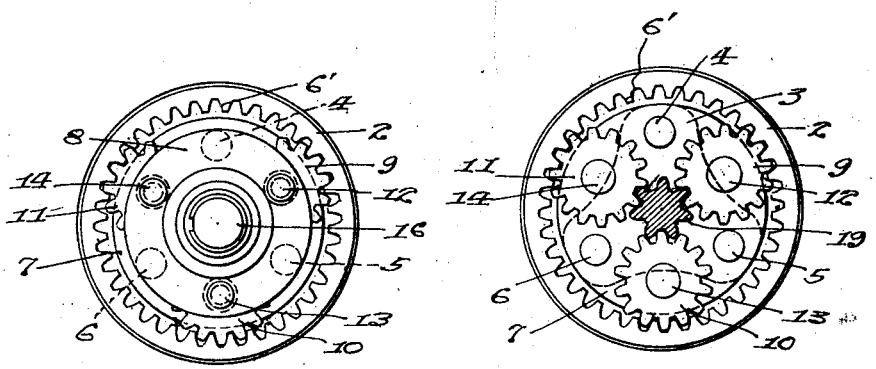
Fig. 2 is a face view of the planetary gearing system, steering wheel and gearing housing being omitted.
Fig. 3 is a sectional view substantially on the line 3—3 of Fig. 1, the housing covering being omitted.

The various figures illustrate the invention drawn substantially to full scale for use with a specific automobile now in wide use but it should be obvious that features thereof may be varied within the scope of the appended claims.

Referring now to the drawings, 1 represents the steering column of an automobile which, at its upper end is enlarged to form a housing 2 for the accommodation of the gears of the planetary system. Mounted within the column 1 is a steering post 2', which at its upper end is provided with a triangular portion 3 that is disposed within the housing 2. The triangular portion 3 is provided with three equally spaced stud shafts 4, 5 and 6. The structure thus far described is now in general use, external spur gears being mounted upon the stud shafts 4, 5 and 6 and meshing with an internal gear corresponding generally to the internal gear 6'. The gears referred to as being mounted on the stud shafts 4, 5 and 6 are in the practice referred to also in mesh with a central external spur gear. In adapting my invention to such a structure, I remove the central spur gear referred to, but not shown, as well as the external spur gears that were mounted upon the stud shafts 4, 5 and 6, likewise referred to but not shown. I substitute therefor a cage composed of a lower plate 7 and an upper plate 8, between which there is positioned a plurality of external spur gears 9, 10 and 11 which are mounted upon shafts 12, 13 and 14. The shafts 12, 13 and 14 also serve as rivets and spacers to hold the plates 7 and 8 in proper spaced relation to permit the free rotation of the spur gears 9, 10 and 11. The shafts 12, 13 and 14, instead of being equally spaced around the center, as are the shafts 4, 5 and 6, that originally carried the spur gears of the structure as referred to, are unequally spaced to the end that the various advantages resulting therefrom may be obtained. The cage with the new external spur gears, however, fits nicely into place, the lower plate 7 being provided with a number of openings 15 which are spaced and of a size to receive the three stud shafts 4, 5 and 6 so that the cage, as a whole, must revolve with the steering post 2' or conversely the steering post 2' must revolve when the cage is revolved by means about to be described.

For rotating the steering post 2' there is provided a short post 16 which, at its lower end, is provided with a reduced portion 17 that extends into an opening 18 in the post 2'. As will be observed, the post 16 passes centrally through the cage containing the intermediate spur gears and is provided along that portion with teeth 19 adapted to mesh with the intermediate gears.

The post 16 is properly aligned with the post 2' by means of its engagement through the medium of a bushing 20 with a cover 21 that is screwed upon a housing 2. 21' represents the steering wheel hub which is keyed to the post 16 as indicated at 22 and final assembly of the parts is completed by the nut 23 which interfits with the threaded upper end portion 24 of the post 16. Thus it will be observed that most of the parts of the initial steering gear equipment may be used and that I have provided new parts which can be quickly and easily assembled. The external appearance is not changed, that is to say the size relation of the respective parts exteriorly is not affected so that a proper balance in design results.

The many advantages of my invention will be understood by those skilled in the art to which this appertains without further comment.

I claim:—

1. A device of the class described embodying therein an internal gear, a centrally arranged external gear, a steering post, spaced rings secured to rotate with the steering post, and a plurality of gears unequally spaced around the central gear, rotatably mounted between said rings, and meshing with both the internal and external gears.

2. A device of the class described embodying therein, an internal gear, a centrally arranged external gear, a steering post, an odd number of gears meshing with said internal gear and centrally arranged external gear, and means comprising spaced plates secured to rotate with said steering post and carrying said odd number of gears in such an arcuate spacing that one of said odd number of gears will have a meshing relation with said external gear which is different from that of another of said odd number of gears.

3. A device of the class described embodying therein an internal gear, a centrally arranged external gear, a steering post having a plurality of spaced stud-shaft-like portions at its upper end, means carrying a plurality of gears and spacing same unequally around the centrally arranged gear, said gears meshing with internal and central external gears, said stud-shaft-like portions entering said gear carrying means to cause the post and gear carrying means to rotate together.

4. A device of the class described embodying therein an internal gear, a centrally arranged external gear, a steering post having a plurality of spaced stud-shaft-like portions at its upper end spaced an equal distance apart, means carrying a plurality of gears and spacing same unequally around the centrally arranged gear, said gears meshing with internal and central external gears, said stud-shaft-like portion entering said gear carrying means to cause the post and gear carrying means to rotate together.

5. A device of the class described embodying therein, an internal gear, a centrally arranged external gear, a steering post, a cage comprising spaced plates connected by studs and positioned around the central external gear and an odd number of gears journalled on said studs connecting said plates and meshing with said internal gear and centrally arranged external gear, said odd number of gears being so disposed on said cage that one of said odd number of gears will have a meshing relation with said external gear which is different from that of another of said odd number of gears.

6. A device of the class described embodying therein, an internal gear, a centrally arranged external gear, a steering post, means providing top and bottom plates with shaft like stud portions carried by the steering post, and a plurality of gears mounted on said stud portions and meshing with said internal gear and said external gear, said stud portions being so angularly spaced that no two of said plurality of gears have the same relative meshing engagement with said external and internal gears.

In testimony whereof, I have hereunto set my hand.

ERLE K. BAKER.